Nov. 24, 1964
V. C. MOORE
3,158,040
TRANSFER DRIVE WITH COUNTERSHAFT AND
INDEPENDENT PLANETARY SETS
Filed Dec. 29, 1961
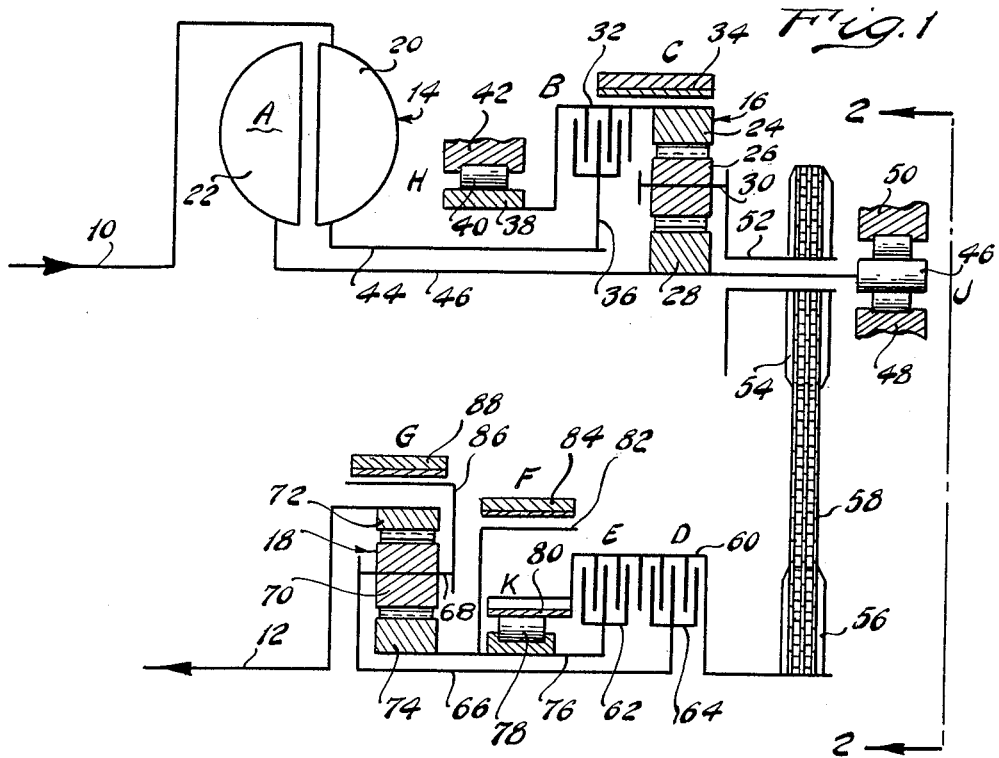
Fig. 1
Fig. 3
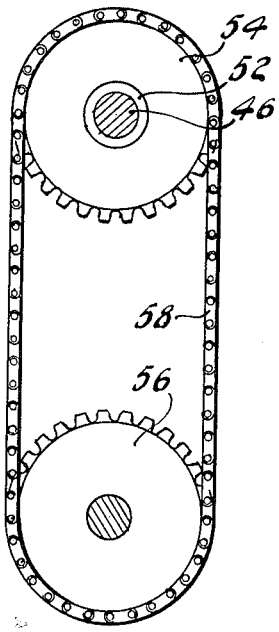
Fig. 2
| SPEEDS | ELEMENTS | | | | | | | | | |
|---|---|---|---|---|---|---|---|---|---|---|
| | A | B | C | D | E | F | G | H | J | K |
| 1-ST | ON | | | ON | | | | ON | | ON |
| 1-ST/O.D. | ON | | | ON | | ON | | ON | | |
| 2-ND | | ON | | ON | | | | | ON | ON |
| 2-ND/O.D. | | ON | | ON | | ON | | | ON | |
| 3-RD | ON | ON | | ON | | | | | | ON |
| 3-RD/O.D. | ON | ON | | ON | | ON | | | | |
| REVERSE | ON | | | | ON | | ON | ON | | |
| BRAKE-1 | ON | | ON | ON | ON | | | | | |
| BRAKE-2 | ON | | ON | ON | | ON | | | | |
INVENTOR.
VICTOR C. MOORE
BY
ATTORNEYS.

United States Patent Office 3,158,040
Patented Nov. 24, 1964

3,158,040
TRANSFER DRIVE WITH COUNTERSHAFT AND INDEPENDENT PLANETARY SETS
Victor C. Moore, Plymouth, Mich., assignor to Ford Motor Company, Dearborn, Mich., a corporation of Delaware
Filed Dec. 29, 1961, Ser. No. 163,148
1 Claim. (Cl. 74—688)

My invention relates generally to improved power transmission mechanisms, and more particularly to improvements in automotive vehicle drivelines.

In wheeled automotive vehicles, the engine is located conventionally in a forward engine compartment. If the traction wheels of the vehicle are located at the rear of the vehicle, a universal joint and drive shaft assembly must be employed to accommodate the transfer of torque from the transmission tail shaft to the rear axle and differential assembly. This requires an indentation or tunnel in the rearward vehicle body understructure. The size of this tunnel often is undesirably large from the standpoint of passenger comfort and vehicle styling. This problem is aggravated by the offset relationship between the vehicle engine crankshaft centerline and the centerline of the drive pinion of the differential and axle assembly.

Another common problem in conventional driveline installations is the relatively large indentation or hump that must be provided in the forward vehicle body understructure to accommodate the transmission itself. If an automatically controlled hydrokinetic transmission is used, the hydrokinetic coupling or converter requires a relatively large bell housing that accentuates the transmission hump in the vehicle body understructure.

In automotive vehicles with forward traction wheels and a forwardly mounted engine, the distribution of torque from the engine crankshaft to the forward traction wheels is difficult to accomplish without compromising the design from a cost or performance standpoint. There is an interference problem here that is due in part to the restricted space available in the engine compartment for the power train and engine accessories, the vehicle suspension system and the controls for the torque transmitting components of the transmission mechanism.

It is an object of my invention to provide a transmission mechanism that will overcome these problems in conventional transmission mechanisms.

It is a further object of my invention to provide a transmission mechanism that can be adapted readily for use in either a front or rear wheel drive vehicle.

It is a further object of my invention to provide a multiple speed transmission mechanism capable of being controlled automatically to provide the various forward driving speed ratio shifts. I contemplate further that my improved structure will be characterized by a relatively high degree of efficiency.

It is a further object of my invention to provide a transmission mechanism of the type above set forth and which comprises both planetary gear torque transmitting elements and a hydrokinetic torque transmitting unit, a portion of the engine torque being transmitted through each path during cruising operation while only a single torque delivery path through the hydrokinetic unit is established during initial acceleration of the vehicle.

It is a further object of my invention to provide a multiple speed power transmission mechanism having improved performance characteristics and a relatively large number of forward driving speed ratios that can be obtained automatically.

Further objects and features of my invention will become apparent from the following description and from the accompanying drawings wherein:

FIGURE 1 is a schematic assembly view of my transmission mechanism;

FIGURE 2 is a partial assembly view of the structure of FIGURE 1 as viewed in an axial direction from the plane of section line 2—2 of FIGURE 1; and, FIGURES 3 is a table illustrating the transmission operating sequence for the transmission clutches and brakes.

Referring first to FIGURE 1, numeral 10 designates a vehicle engine crankshaft and numeral 12 designates a power output shaft, the latter in turn being connected drivably to the forward driving axles of the vehicle through a suitable differential gear mechanism. The arrangement of FIGURE 1 is adapted particularly to be used in a front wheel drive vehicle with a forwardly situated engine.

Numeral 14 designates generally a hydrodynamic fluid coupling and numeral 16 designates generally a simple planetary gear unit. A second, simple planetary gear unit is shown at 18, the axis of the gear unit 18 being common to the axis of power output shaft 12. The axis of gear unit 16 is common to the axis of coupling 14 and crankshaft 10.

Coupling 14 includes an impeller member 20 and a turbine member 22. The pump and turbine members 22 are in the form of a semitorus and cooperate with each other to define a toroidal fluid flow circuit in a conventional fashion.

Gear unit 16 includes a ring gear 24, planet gears 26, and a sun gear 28, the planet gears 26 being journaled for rotation upon a carrier 30. The planet gears 26 are situated in meshing engagement with ring gear 24 and sun gear 28.

Ring gear 24 is connected to a brake drum 32 about which brake band 34 is disposed. Drum 32 carries clutch discs that cooperate with other clutch discs carried by a clutch member 36. Drum 32 is connected also to the inner race 38 of an overrunning brake that includes roller elements 40 and a relatively stationary outer race 42, the race 42 being defined by or connected to the stationary transmission housing.

Impeller member 20 is coupled drivably to clutch member 36 by means of a sleeve shaft 44. A central shaft 46 establishes a driving connection between turbine member 22 and sun gear 28. An overrunning brake is provided for inhibiting relative rotation of sun gear 28 and shaft 46 in one direction. This brake includes rollers 48 acting against a relatively stationary outer brake race 50.

Carrier 30 is connected drivably to sleeve 52 that is connected to the hub of a drive sprocket 54. A cooperating driven sprocket 56 is arranged as shown for rotation about an axis that is parallel to the axis of sprocket 54. A driving chain 58 is trained over each of the sprockets 54 and 56 to establish a driving connection therebetween. I contemplate, however, that other driving means such as a belt and sheaves may be used in lieu of the chain 58 and sprockets 54 and 56. Driving sprocket 56 is connected drivably to a clutch drum 60. This drum carries multiple clutch discs that form a part of two friction clutch assemblies, one clutch assembly including clutch member 62 and the other including clutch member 64. Each of these clutch members 62 and 64 carries friction discs that cooperate with the discs carried by drum 60. Clutch member 64 is connected driveably to a central shaft 66 that in turn is connected to a carrier member 68 on the planetary gear unit 18. Planet pinions 70 are journaled for rotation upon carrier member 68. These pinions are in meshing engagement with a ring gear member 72 of the gear unit 18 and the sun gear member 74 is connected to clutch member 62 by means of sleeve shaft 76. Sleeve shaft 76 in turn is connected to an inner race for an overrunning clutch that includes rollers 78. The outer race for the rollers 78 is shown at 80 and it is connected to the aforementioned clutch drum 60.

A brake drum 82 is connected also to the sleeve shaft 76. A brake band 84 is arranged about the drum 82 and is adapted to anchor the same selectively. Another brake drum 86 is connected to carrier 68, and a brake band 88 encircles drum 86 so that it can be anchored selectively.

Suitable fluid pressure operated servos can be provided to engage selectively brake bands 34, 84 and 88 with their respective brake drums. Similarly, suitable fluid pressure operated servos can be employed for applying any of the three multiple disc clutch assemblies.

For convenience in describing the mode of operation of the structure of FIGURE 1, I have shown in FIGURE 3 a table indicating the elements that must be applied and released to establish the various transmission speed ratios. Also for convenience I have designated the turbine 22 as element A. The first clutch is identified as element B and the first brake is identificated as element C. The second clutch is identified as element D and the third clutch is identified as element E. The second brake band is identified as element F, the third brake band is identified as element G, and the overrunning coupling members shown in part at 40, 46 and 78 are identified by the letters H, J and K, respectively.

To establish first speed ratio operation, clutch element D is applied. Turbine torque from turbine member A then is transferred to sun gear 22 and brake H transfers the resulting torque reaction of ring gear 24 to the transmission casing thus holding the ring gear 24 stationary. The resulting output torque from the gear unit 16 is transferred from carrier 30 to the sprocket 54, the latter in turn driving sprocket 56 by means of drive chain 58. The torque then is transferred through energized clutch D to shaft 66 and carrier 68. The tendency for the sun gear 74 to overrun is inhibited by the overrunning coupling K. Thus, the planetary gear unit 18 assumes a locked-up condition and all the gear members thereof will rotate in unison. An overdrive condition in the gear unit 18 can be established by applying brake F. This establishes the next highest speed ratio. The operation of the gear unit 16 remains unchanged.

The so-called second speed ratio can be obtained by applying clutch B while clutch D continues to be energized. Impeller torque then is distributed directly to the ring gear 24 and the brake H then will overrun the carrier 30 and the drive sprocket 54 at an increased speed ratio. In this instance, the sun gear 28 functions as a reaction member rather than the ring gear 24. The torque reaction on the sun gear 28 is transferred to the stationary transmission housing through brake J. This brake J inhibits reverse rotation of sun gear 28 although forward driving motion on sun gear 28 can be accommodated as previously seen.

A second overdrive condition can be obtained as before by applying brake band F. The gear unit 18 again functions as a speed ratio splitter and doubles the number of speed ratios that can be obtained by the unit 16 acting alone.

During operation in both the second speed ratio and second speed ratio overdrive conditions, it is necessary to dump fluid from coupling 14 so that the sun gear 28 and driven member 22 can be held stationary. The torque flow path through the hydrokinetic unit thus is eliminated and only the mechanical torque transfer path remains. To establish third speed ratio operation, it merely is necessary to refill the coupling 14. The clutch element B remains applied so that the planetary gear unit 16 assumes a substantially locked-up condition although there is a split torque path through this unit, approximately one-third of the torque being distributed hydrodynamically through the coupling 14 and the remaining portion being distributed through the wholly mechanical power flow path. The overdrive condition for third speed ratio operation can be obtained as before by applying brake band F.

Reverse drive can be obtained by applying clutch E and applying brake band G. The coupling 14 is filled under these conditions and turbine torque then is distributed to sun gear 28 and multiplied by the gear unit 16, the brake H functioning to take the resulting torque reaction of the ring gear 24. The torque then transmitted through the drive chain is distributed through clutch E to the sun gear 74. Since the carrier 60 is anchored by brake G, the ring gear 72 and the power output shaft 12 are driven in a reverse direction.

The chart of FIGURE 3 illustrates also the members that must be applied to obtain engine braking. Two gear ratios are available depending upon whether clutch E or brake F is applied.

Having thus described a preferred form of my invention, what I claim and desire to secure by U.S. Letters Patent is:

A torque transmitting mechanism comprising, a first longitudinally extending transmission having a forwardly rotating power input shaft axially aligned with a power output shaft, and means drivingly connecting said shafts, a second longitudinally extending transmission positioned parallel to and spaced radially from said first transmission and having axially aligned power input and output shafts, and means drivingly connecting said second transmission power shafts, and power transfer means for transferring the power in both directions between the power output shaft of said first transmission and the power input shaft of said second transmission, said transmissions each having a planetary gearset each having sun and ring gears and a planet carrier, said first transmission having a fluid coupling capable of being filled and emptied of fluid to control the transmission of torque therethrough, said coupling having a pump connected to said power input shaft and a turbine connected to said sun gear, said carrier being connected to said power output shaft, separate over-running brakes for holding said ring and sun gears against reverse rotation while permitting overrun thereof in a forward direction, a selectively engageable clutch connecting said pump and said ring gear, a selectively engageable brake for holding said ring gear against rotation in either direction, the selective filling and emptying of said coupling together with the selective engagement of said brake and clutch and the automatic operation of said overrun brakes providing a plurality of different drives through said first transmission, said power transfer means including separate wheels secured to said first transmission power output shaft and said second transmission power input shaft, a flexible torque transmitting member trained about said wheels for transferring a drive therebetween, said second transmission having a dual clutch having one portion connected to said power input shaft and separate selectively engageable portions connected to said second transmission sun gear and carrier, said separate portions connected to said second sun gear including a parallel connection having an overrunning clutch preventing overrun of said sun gear in one direction relative to said one second transmission input shaft while permitting it be overrun in the opposite direction, the engagement of the clutch portion in parallel therewith bypassing the drive around said overrun clutch and providing a two-way drive between the sun gear and power input shaft, selectively engageable brakes for said second sun gear and carrier, respectively, preventing rotation thereof in either direction, the engagement of the portion of said dual clutch connecting said carrier and input shaft, together with the selective engagement of the second transmission brakes and the automatic operation of said overrun clutch providing a plurality of drives through said second transmission to at times compound the drive transferred from said first transmission through said power transfer means.

References Cited in the file of this patent

UNITED STATES PATENTS

| | | |
|---|---|---|
| 2,091,356 | Fawcett | Aug. 31, 1937 |
| 2,352,004 | Pollard | June 20, 1944 |
| 2,760,386 | Southwick | Aug. 28, 1956 |
| 2,854,862 | Foerster | Oct. 7, 1958 |
| 2,856,794 | Simpson | Oct. 21, 1958 |
| 2,910,889 | Lackey | Nov. 3, 1959 |
| 2,933,944 | Carnagua | Apr. 26, 1960 |
| 3,029,662 | Hause | Apr. 17, 1962 |